(12) United States Patent
Garbow et al.

(10) Patent No.: US 7,646,960 B2
(45) Date of Patent: Jan. 12, 2010

(54) DETERMINING CHAPTERS BASED ON PRESENTATION OF A PROGRAM

(75) Inventors: Zachary Adam Garbow, Rochester, MN (US); Michael Anthony Nelson, Rochester, MN (US); Kevin Glynn Paterson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 11/149,481

(22) Filed: Jun. 9, 2005

(65) Prior Publication Data

US 2006/0282859 A1    Dec. 14, 2006

(51) Int. Cl.
*H04N 5/91* (2006.01)
*H04N 7/00* (2006.01)
*H04N 7/26* (2006.01)
*H04N 5/00* (2006.01)

(52) U.S. Cl. .................. 386/68; 386/124; 386/125; 386/126

(58) Field of Classification Search ............. 386/1, 386/46, 52, 68, 69, 83, 95, 98, 110, 124–126; 725/45–53
See application file for complete search history.

(56) References Cited

U.S. PATENT DOCUMENTS

| | | | |
|---|---|---|---|
| 2003/0037333 A1* | 2/2003 | Ghashghai et al. | 725/46 |
| 2005/0086692 A1* | 4/2005 | Dudkiewicz et al. | 725/46 |
| 2005/0207733 A1* | 9/2005 | Gargi | 386/68 |

* cited by examiner

*Primary Examiner*—Marsha D Banks Harold
*Assistant Examiner*—Marc Dazenski
(74) *Attorney, Agent, or Firm*—Owen J. Gamon

(57) ABSTRACT

A method, apparatus, system, and signal-bearing medium that, in an embodiment, calculate scores for cells within a program based on a speed at which the cells were presented and a frequency that the cells were presented. A cell includes one or more frames of presentable data. Chapters within the program are then determined and located within the program based on gradients of the scores that exceed a threshold. The scores are calculated based on incrementing a score for each cell each time the cell is presented and by different amounts depending on the speed at which the cell is presented. In an embodiment, the score is incremented by a larger amount in response to a slower presentation speed of the associated cell. In an embodiment, scores may be received from multiple clients where the program was presented, the scores may be aggregated for all the clients, and the chapters may be determined based on the aggregated scores. The scores may further be used to change the presentation speed of the program based on the scores of the cells being presented or skipped.

19 Claims, 9 Drawing Sheets

USER INTERFACE

○ NUMBER OF CHAPTERS:  [ 10 ]
505

○ CHAPTER SENSITIVITY:  ○ LOW
510  ○ MEDIUM
  ○ HIGH

○ SOURCE OF CHAPTERS:  ○ PREDEFINED  520
515  ○ PREVIOUS VIEWING(S) 525
  BY CURRENT VIEWER
  ○ PREVIOUS VIEWING(S) 530
  BY ALL VIEWERS
  ○ PREVIOUS VIEWING(S) BY 535
  SPECIFIED VIEWER(S)

FIG. 5

DETERMINING CHAPTERS BASED ON PRESENTATION OF A PROGRAM

FIELD

An embodiment of the invention generally relates to digital video recorders. In particular, an embodiment of the invention generally relates to creating chapters in a program based on the presentation of the program.

BACKGROUND

Television is certainly one of the most influential forces of our time. Through the device called a television set or TV, viewers are able to receive news, sports, entertainment, information, and commercials. A few events stand out as extremely important in the history of television. The invention of the black-and-white TV set and the first broadcasts of television signals in 1939 and 1940 initiated the television age. This was followed by color television and its huge popularity starting in the 1950s. Cable and satellite television began competing with broadcast networks in the 1970s. In this same list must go the development and popularization of the VCR (video cassette recorder) starting in the 1970s and 1980s.

The VCR marks one of the most important events in the history of television because, for the first time, the VCR gave the viewers control of what they could watch on their TV sets and at what time. The VCR spawned the video rental and sales market, and today, VCRs are commonplace.

Now, a new innovation makes recording television programs even more convenient: the digital video recorder, or DVR. The television signal comes into the digital video recorder's built-in tuner through an antenna, cable, or satellite. If the signal comes from an analog antenna or cable, it goes into an encoder, which converts the data from analog to digital form. From the encoder, the signal is sent to two different places: first, to an internal hard drive for storage, and second, to a decoder, which converts the signal back to analog and sends it to the television for viewing. For a satellite signal and for cable and antenna signals that are already digital, the encoder is not necessary.

Although the digital video recorder performs much the same functions as a VCR, there are some important differences. First, a digital video recorder is tape-less and has no removable media. With a VCR, the device itself is merely a recording tool; the blank cassette is the removable media. In a digital video recorder, the media and tool are one and the same, which is advantageous because buying and cataloging tapes are unnecessary. Second, because the digital video recorder typically stores the audio and video content in digital form on a hard drive, which is a random access device, the digital video recorder can access or skip between a variety of locations within the content without needing to start at the beginning and perform a sequential search.

Because of this ability to easily move between locations of the content, the viewing habits of users are becoming increasingly segmented, as viewers prefer the ability to skip around a program rather than watching it sequentially from start to finish. Further, viewers increasingly do not watch entire shows; instead, they just watch the portions in which they are most interested. This trend is readily apparent in the way people view media in the following three examples. First, for recorded programming on digital video recorders, viewers frequently skip past commercials, time-outs of sports events, movie credits, or slow spots. They also typically skip segments of content, for example using a thirty second fast forward command or a ten second rewind command. Second, viewers use file-sharing of content, where the viewers download and share just the portion of a program that is of the most interest. Third, in movies, viewers may skip to the appropriate chapter or special feature that they wish to watch, using a menu or table of contents.

Unfortunately, viewers do not typically know in which content they are interested until they see it. For example, if a viewer has recorded a program for later watching, the viewer may have heard or read that a particularly interesting, unusual, newsworthy, funny, or controversial event occurred sometime in the program, but the viewer does not have a way to find that event in the program without extensive searching. Further, even if the viewer has seen the segment of interest once, the viewer may experience difficulty in finding it again, because the viewer cannot necessarily remember the exact location within the program.

Thus, there is a need for a better technique to aid viewers in finding content of interest within programs. Although the aforementioned problems have been described in the context of a digital video recorder, they may apply to any electronic device that presents media content, whether the content is video, audio, video and audio, or still images.

SUMMARY

A method, apparatus, system, and signal-bearing medium are provided that, in an embodiment, calculate scores for cells within a program based on a speed at which the cells were presented and a frequency that the cells were presented. A cell includes one or more frames of presentable data. Chapters within the program are then determined and located within the program based on gradients of the scores that exceed a threshold. The scores are calculated based on incrementing a score for each cell each time the cell is presented and by different amounts depending on the speed at which the cell is presented.

In an embodiment, the score is incremented by a larger amount in response to a slower presentation speed of the associated cell. In an embodiment, scores may be received from multiple clients where the program was presented, the scores may be aggregated for all the clients, and the chapters may be determined based on the aggregated scores. The scores may further be used to change the presentation speed of the program based on the scores of the cells being presented or skipped.

BRIEF DESCRIPTION OF THE DRAWING

FIG. 5 depicts a block diagram of an example chapter user interface, according to an embodiment of the invention.

DETAILED DESCRIPTION

Figure 1:
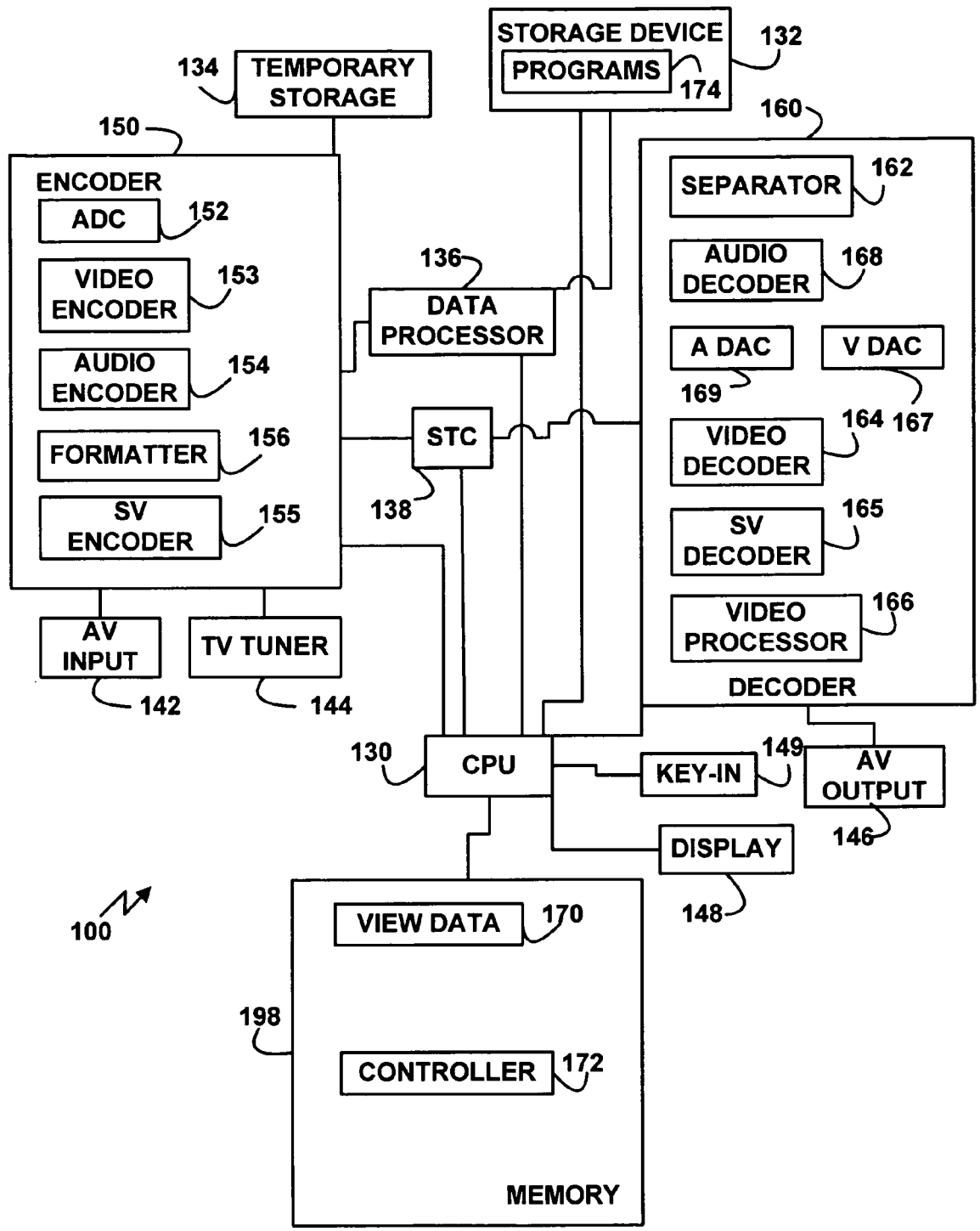
FIG. 1 depicts a block diagram of an example digital video recorder for implementing an embodiment of the invention.

Referring to the Drawings, wherein like numbers denote like parts throughout the several views, FIG. 1 depicts a block diagram of an example digital video recorder 100 used for recording/playing back digital moving image and/or audio information, according to an embodiment of the invention. The digital video recorder 100 includes a CPU (central processing unit) 130, a storage device 132, temporary storage 134, a data processor 136, a system time counter 138, an audio/video input 142, a TV tuner 144, an audio/video output 146, a display 148, a key-in 149, an encoder 150, a decoder 160, and memory 198.

The CPU 130 may be implemented via a programmable general purpose central processing unit that controls operation of the digital video recorder 100.

The storage device 132 may be implemented by a direct access storage device (DASD), a DVD-RAM, a CD-RW, or any other type of storage device capable of encoding, reading, and writing data. The storage device 132 stores the programs 174. The programs 174 are data that is capable of being stored, retrieved, and presented. In various embodiments, the programs 174 may be television programs, radio programs, movies, video, audio, still images, graphics, or any combination thereof.

The encoder section 150 includes an analog-digital converter 152, a video encoder 153, an audio encoder 154, a sub-video encoder 155, and a formatter 156. The analog-digital converter 152 is supplied with an external analog video signal and an external analog audio signal from the audio-video input 142 or an analog TV signal and an analog voice or audio signal from the TV tuner 144. The analog-digital converter 152 converts an input analog video signal into a digital form. That is, the analog-digital converter 152 quantitizes into digital form a luminance component Y, color difference component Cr (or Y-R), and color difference component Cb (or Y-B). Further, the analog-digital converter 152 converts an input analog audio signal into a digital form.

When an analog video signal and digital audio signal are input to the analog-digital converter 152, the analog-digital converter 152 passes the digital audio signal therethrough as it is. At this time, a process for reducing the jitter attached to the digital signal or a process for changing the sampling rate or quantization bit number may be effected without changing the contents of the digital audio signal. Further, when a digital video signal and digital audio signal are input to the analog-digital converter 152, the analog-digital converter 152 passes the digital video signal and digital audio signal therethrough as they are. The jitter reducing process or sampling rate changing process may be effected without changing the contents of the digital signals.

The digital video signal component from the analog-digital converter 152 is supplied to the formatter 156 via the video encoder 153. The digital audio signal component from the analog-digital converter 152 is supplied to the formatter 156 via the audio encoder 154.

The video encoder 153 converts the input digital video signal into a compressed digital signal at a variable bit rate. For example, the video encoder 153 may implement the MPEG2 or MPEG1 specification, but in other embodiments any appropriate specification may be used.

The audio encoder 154 converts the input digital audio signal into a digital signal (or digital signal of linear PCM (Pulse Code Modulation)) compressed at a fixed bit rate based, e.g., on the MPEG audio or AC-3 specification, but in other embodiments any appropriate specification may be used.

When a video signal is input from the audio-video input 142 or when the video signal is received from the TV tuner 144, the sub-video signal component in the video signal is input to the sub-video encoder 155. The sub-video data input to the sub-video encoder 155 is converted into a preset signal configuration and then supplied to the formatter 156. The formatter 156 performs preset signal processing for the input video signal, audio signal, sub-video signal and outputs record data to the data processor 136.

The temporary storage section 134 buffers a preset amount of data among data (data output from the encoder 150) written into the storage device 132 or buffers a preset amount of data among data (data input to the decoder section 160) played back from the storage device 132. The data processor 136 supplies record data from the encoder section 150 to the storage device 132, extracts a playback signal played back from the storage device 132, rewrites management information recorded on the storage device 132, or deletes data recorded on the storage device 132 according to the control of the CPU 130.

The contents to be notified to the user of the digital video recorder 100 are displayed on the display 148 or are displayed on a TV or monitor (not shown) attached to the audio-video output 146.

The timings at which the CPU 130 controls the storage device 132, data processor 136, encoder 150, and/or decoder 160 are set based on time data from the system time counter 138. The recording/playback operation is normally effected in synchronism with the time clock from the system time counter 138, and other processes may be effected at a timing independent from the system time counter 138.

The decoder 160 includes a separator 162 for separating and extracting each pack from the playback data, a video decoder 164 for decoding main video data separated by the separator 162, a sub-video decoder 165 for decoding sub-video data separated by the separator 162, an audio decoder 168 for decoding audio data separated by the separator 162, and a video processor 166 for combining the sub-video data from the sub-video decoder 165 with the video data from the video decoder 164.

The video digital-analog converter 167 converts a digital video output from the video processor 166 to an analog video signal. The audio digital-analog converter 169 converts a digital audio output from the audio decoder 168 to an analog audio signal. The analog video signal from the video digital-analog converter 167 and the analog audio signal from the audio digital-analog converter 169 are supplied to external components (not shown), which are typically a television set, monitor, or projector, via the audio-video output 146.

Next, the recording process and playback process of the digital video recorder 100 are explained, according to an embodiment of the invention. At the time of data processing for recording, if the user first effects the key-in operation via the key-in 149, the CPU 130 receives a recording instruction for a program and reads out management data from the storage device 132 to determine an area in which video data is recorded. In another embodiment, the CPU 130 determines the program to be recorded.

Then, the CPU 130 sets the determined area in a management area and sets the recording start address of video data on the storage device 132. In this case, the management area specifies the file management section for managing the files, and control information and parameters necessary for the file management section are sequentially recorded.

Next, the CPU 130 resets the time of the system time counter 138. In this example, the system time counter 138 is a timer of the system and the recording/playback operation is effected with the time thereof used as a reference.

The flow of a video signal is as follows. An audio-video signal input from the audio-video input 142 or the TV tuner 144 is A/D converted by the analog-digital converter 152, and the video signal and audio signal are respectively supplied to the video encoder 153 and audio encoder 154, and the closed caption signal from the TV tuner 144 or the text signal of text broadcasting is supplied to the sub-video encoder 155.

The encoders 153, 154, 155 compress the respective input signals to make packets, and the packets are input to the formatter 156. In this case, the encoders 153, 154, 155 determine and record PTS (presentation time stamp), DTS (decode time stamp) of each packet according to the value of the system time counter 138. The formatter 156 sets each input packet data into packs, mixes the packs, and supplies the result of mixing to the data processor 136. The data processor 136 sends the pack data to the storage device 132, which stores it as one of the programs 174.

At the time of playback operation, the user first effects a key-in operation via the key-in 149, and the CPU 130 receives a playback instruction therefrom. Next, the CPU 130 supplies a read instruction and address of the program 174 to be played back to the storage device 132. The storage device 132 reads out sector data according to the supplied instruction and outputs the data in a pack data form to the decoder section 160.

In the decoder section 160, the separator 162 receives the readout pack data, forms the data into a packet form, transfers the video packet data (e.g., MPEG video data) to the video decoder 164, transfers the audio packet data to the audio decoder 168, and transfers the sub-video packet data to the sub-video decoder 165.

After this, the decoders 164, 165, 168 effect the playback processes in synchronism with the values of the PTS of the respective packet data items (output packet data decoded at the timing at which the values of the PTS and system time counter 138 coincide with each other) and supply a moving picture with voice caption to the TV, monitor, or projector (not shown) via the audio-video output 146.

The memory 198 is connected to the CPU 130 and includes the view data 170 and the controller 172. The view data 170 describes the way in which portions of the program 174 were viewed. In another embodiment, the view data 170 is embedded in or stored with the programs 174. The view data 170 is further described below with reference to FIG. 3C.

The controller 172 includes instructions capable of executing on the CPU 130 or statements capable of being interpreted by instructions executing on the CPU 130 to manipulate the view data 170 and the programs 174, as further described below with reference to FIGS. 3A, 3B, and 3C and to perform the functions as further described below with reference to FIGS. 4, 5, 6, 7, and 9B. In another embodiment, the controller 172 may be implemented in microcode. In another embodiment, the controller 172 may be implemented in hardware via logic gates and/or other appropriate hardware techniques in lieu of, or in addition to, a processor-based digital video recorder.

In other embodiments, the digital video recorder 100 may be implemented as a personal computer, mainframe computer, portable computer, laptop or notebook computer, PDA (Personal Digital Assistant), tablet computer, pocket computer, television, set-top box, cable decoder box, telephone, pager, automobile, teleconferencing system, camcorder, radio, audio recorder, audio player, stereo system, MP3 (MPEG Audio Layer 3) player, digital camera, appliance, or any other appropriate type of electronic device.

Figure 2:
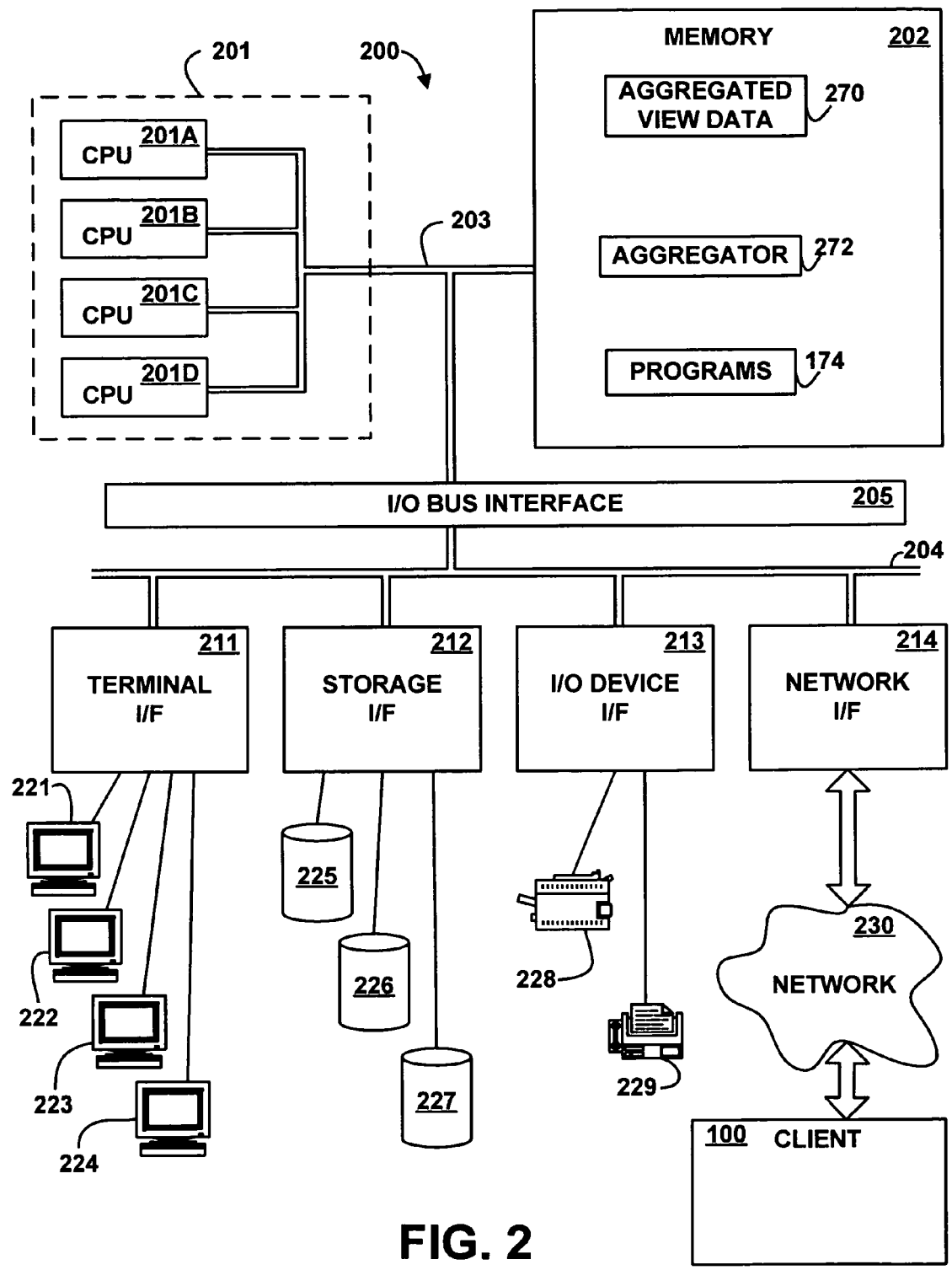
FIG. 2 depicts a block diagram of an example computer system for implementing an embodiment of the invention.

FIG. 2 depicts a high-level block diagram representation of a server computer system 200 connected to the client digital video recorder 100 via a network 230, according to an embodiment of the present invention. The words "client" and "server" are used for convenience only, and in other embodiments an electronic device that operates as a client in one scenario may operate as a server in another scenario, or vice versa. The major components of the computer system 200 include one or more processors 201, a main memory 202, a terminal interface 211, a storage interface 212, an I/O (Input/Output) device interface 213, and communications/network interfaces 214, all of which are coupled for inter-component communication via a memory bus 203, an I/O bus 204, and an I/O bus interface unit 205.

The computer system 200 contains one or more general-purpose programmable central processing units (CPUs) 201A, 201B, 201C, and 201D, herein generically referred to as the processor 201. In an embodiment, the computer system 200 contains multiple processors typical of a relatively large system; however, in another embodiment the computer system 200 may alternatively be a single CPU system. Each processor 201 executes instructions stored in the main memory 202 and may include one or more levels of on-board cache.

The main memory 202 is a random-access semiconductor memory for storing data and computer programs. The main memory 202 is conceptually a single monolithic entity, but in other embodiments the main memory 202 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 202 includes aggregated view data 270, an aggregator 272, and programs 174. Although the aggregated view data 270, the aggregator 272, and the programs 174 are illustrated as being contained within the memory 202 in the computer system 200, in other embodiments some or all may be on different computer systems and may be accessed remotely, e.g., via the network 230. In another embodiment, the aggregated view data 270 is embedded in or stored with the programs 174. The computer system 200 may use virtual addressing mechanisms that allow the software of the computer system 200 to behave as if it only has access to a large, single storage entity instead of access to multiple, smaller storage entities. Thus, while the aggregated view data 270, the aggregator 272, and the programs 174 are illustrated as residing in the memory 202, these elements are not necessarily all completely contained in the same storage device at the same time.

In an embodiment, the aggregator 272 includes instructions capable of executing on the processors 201 or statements capable of being interpreted by instructions executing on the processors 201 to manipulate the aggregated view data 270 and the programs 174, as further described below with reference to FIGS. 3A and 3B and to perform the functions as further described below with reference to FIGS. 9A and 9B. In another embodiment, the aggregator 272 may be implemented in microcode. In another embodiment, the aggregator 272 may be implemented in hardware via logic gates and/or other appropriate hardware techniques in lieu of, or in addition to, a processor-based system. The aggregated view data 270 represents an aggregation of multiple view data 170, representing multiple presentations of a particular program 174 at multiple clients 100.

The memory bus 203 provides a data communication path for transferring data among the processors 201, the main memory 202, and the I/O bus interface unit 205. The I/O bus interface unit 205 is further coupled to the system I/O bus 204 for transferring data to and from the various I/O units. The I/O bus interface unit 205 communicates with multiple I/O interface units 211, 212, 213, and 214, which are also known as I/O processors (IOPs) or I/O adapters (IOAs), through the system I/O bus 204. The system I/O bus 204 may be, e.g., an industry standard PCI (Peripheral Component Interconnect) bus, or any other appropriate bus technology. The I/O interface units support communication with a variety of storage and I/O devices. For example, the terminal interface unit 211 supports the attachment of one or more user terminals 221, 222, 223, and 224.

Although the memory bus 203 is shown in FIG. 2 as a relatively simple, single bus structure providing a direct communication path among the processors 201, the main memory 202, and the I/O bus interface 205, in another embodiment the memory bus 203 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 205 and the I/O bus 204 are shown as single respective units, in other embodiments the computer system 200 may contain multiple I/O bus interface units 205 and/or multiple I/O buses 204. While multiple I/O interface units are shown, which separate the system I/O bus 204 from various communications paths running to the various I/O devices, in other embodiments some or all of the I/O devices are connected directly to one or more system I/O buses.

The storage interface unit 212 supports the attachment of one or more direct access storage devices (DASD) 225, 226, and 227 (which are typically rotating magnetic disk drive storage devices, although they could alternatively be other devices, including arrays of disk drives configured to appear as a single large storage device to a host). The I/O and other device interface 213 provides an interface to any of various other input/output devices or devices of other types. Two such devices, the printer 228 and the fax machine 229, are shown in the exemplary embodiment of FIG. 2, but in other embodiment many other such devices may exist, which may be of differing types. The network interface 214 provides one or more communications paths from the computer system 200 to other digital electronic devices and computer systems; such paths may include, e.g., one or more networks 230.

The network 230 may be any suitable network or combination of networks and may support any appropriate protocol suitable for communication of data, programs, and/or code to/from the computer system 200 and/or the client 100. In an embodiment, the network 230 may represent a television network, whether cable, satellite, or broadcast TV, either analog or digital. In an embodiment, the network 230 may represent a storage device or a combination of storage devices, either connected directly or indirectly to the computer system 200. In an embodiment, the network 230 may support Infiniband. In another embodiment, the network 230 may support wireless communications. In another embodiment, the network 230 may support hard-wired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be a FRS (Family Radio Service) network. In another embodiment, the network 230 may be any appropriate cellular data network or cell-based radio network technology. In another embodiment, the network 230 may be an IEEE 802.11 B wireless network. In still another embodiment, the network 230 may be any suitable network or combination of networks. Although one network 230 is shown, in other embodiments any number of networks (of the same or different types) may be present.

The computer system 200 depicted in FIG. 2 has multiple attached terminals 221, 222, 223, and 224, such as might be typical of a multi-user "mainframe" computer system. Typically, in such a case the actual number of attached devices is greater than those shown in FIG. 2, although the present invention is not limited to systems of any particular size. The computer system 200 may alternatively be a single-user system, typically containing only a single user display and keyboard input, or might be a server or similar device that has little or no direct user interface, but receives requests from other computer systems (clients). In other embodiments, the computer system 200 may be implemented as a personal computer, portable computer, laptop or notebook computer, PDA (Personal Digital Assistant), tablet computer, pocket computer, telephone, pager, automobile, teleconferencing system, video recorder, camcorder, audio recorder, audio player, stereo system, MP3 (MPEG Audio Layer 3) player, digital camera, appliance, or any other appropriate type of electronic device.

It should be understood that FIGS. 1 and 2 are intended to depict the representative major components of the client 100, the computer system 200, and the network 230 at a high level, that individual components may have greater complexity than that represented in FIGS. 1 and 2, that components other than, instead of, or in addition to those shown in FIGS. 1 and 2 may be present, and that the number, type, and configuration of such components may vary. Several particular examples of such additional complexity or additional variations are disclosed herein; it being understood that these are by way of example only and are not necessarily the only such variations.

The various software components illustrated in FIGS. 1 and 2 and implementing various embodiments of the invention may be implemented in a number of manners, including using various computer software applications, routines, components, programs, objects, modules, data structures, etc., referred to hereinafter as "computer programs." The computer programs typically comprise one or more instructions that are resident at various times in various memory and storage devices in the client 100 and the computer system 200, and that, when read and executed by one or more processors 130 or 136 in the client 100 and/or the processor 201 in the computer system 200, cause the client 100 and/or the computer system 200 to perform the steps necessary to execute steps or elements embodying the various aspects of an embodiment of the invention.

Moreover, while embodiments of the invention have and hereinafter will be described in the context of fully functioning computer systems and digital video recorders, the various embodiments of the invention are capable of being distributed as a program product in a variety of forms, and the invention applies equally regardless of the particular type of signal-bearing medium used to actually carry out the distribution. The programs defining the functions of this embodiment may be delivered to the client digital video recorder 100 and/or the computer system 200 via a variety of tangible signal-bearing recordable media, which include, but are not limited to:

(1) information permanently stored on a non-rewriteable storage medium, e.g., a read-only memory device attached to or within a computer system, such as a CD-ROM readable by a CD-ROM drive; and (2) alterable information stored on a rewriteable storage medium, e.g., a hard disk drive (e.g., DASD 225, 226, or 227, the storage device 132, or the memory 198), a CD-RW, or diskette.

Such tangible signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figure 3A:
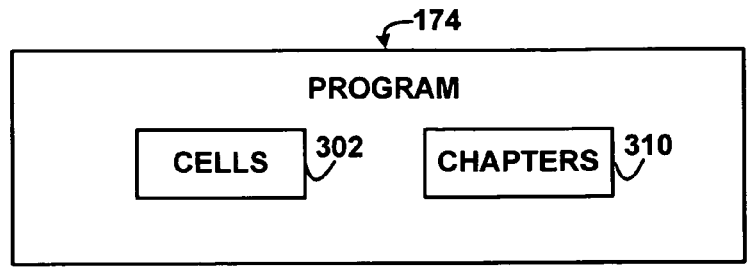
FIG. 3A depicts a block diagram of an example program, according to an embodiment of the invention.

FIG. 3A depicts a block diagram of an example program 174, according to an embodiment of the invention. The example program 174 includes cells 302 and chapters 310. The cells 302 may represent any number of frames or any time period of frames or other presentable material within the program 174. A frame represents material that may be presented at any one time. For example, if the program 174 includes video, a frame is a still image, and displaying frames in succession over time creates the illusion of motion. Frames per second (FPS) is a measure of how much information is used to store and display motion video. Frames per second applies equally to film video and digital video. The more frames per second, the smoother the motion appears. Television in the United States, for example, is based on the NTSC (National Television System Committee) format, which displays 30 interlaced frames per second, but in other embodiments any number of frames per second and any appropriate format or standard for storing and presenting the program 174 may be used. Embodiments of the invention may include video only, video and audio, audio only, or still images. Examples of various standards and formats include: PAL (Phase Alternate Line), SECAM (Sequential Color and Memory), RS170, RS 330, HDTV (High Definition Television), MPEG (Motion Picture Experts Group), DVI (Digital Video Interface), SDI (Serial Digital Interface), AIFF, AU, CD, MP3, QuickTime, RealAudio, WAV, and PCM (Pulse Code Modulation).

The chapters 310 represent locations within the cells 302 that may be jumped to or moved to prior to the start presentation of the program 174 or during the presentation of the program 174. Thus, the chapters 310 conceptually exist within the cells 302 (as further described below with reference to FIG. 3B) but the chapters 310 may actually be stored in memory separately from the cells 302. In various embodiments, the chapters 310 may be created by the controller 172, may be created by the aggregator 272, may be pre-existing in the programs 174, or by any combination thereof.

Figure 3B:
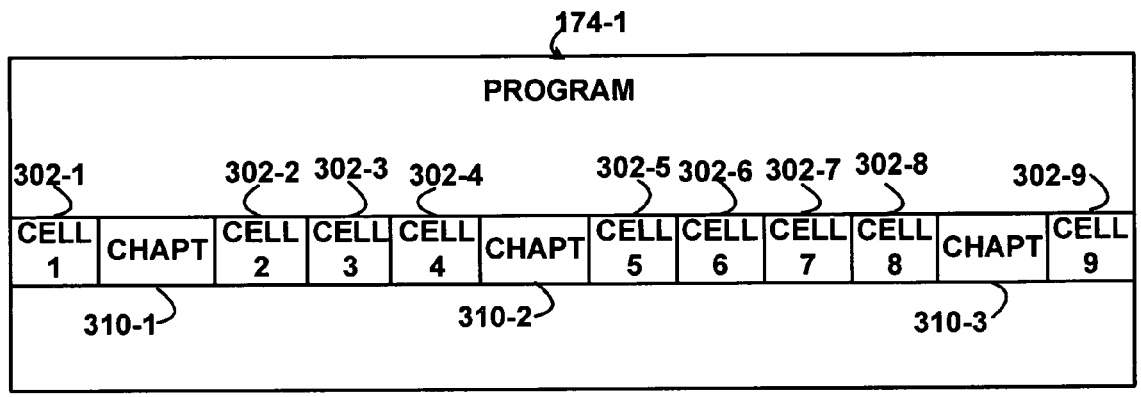
FIG. 3B depicts a block diagram of a conceptual view of an example program with cells and chapters, according to an embodiment of the invention.

FIG. 3B depicts a block diagram of a conceptual view of a program 174-1 with cells and chapters, which is an example of the programs 174, according to an embodiment of the invention. The example program 174-1 includes cells 302-1, 302-2, 302-3, 302-4, 302-5, 302-6, 302-7, 302-8, and 302-9, which are all examples of the cells 302 (FIG. 3A). The example program 174-1 further includes chapters 310-1, 310-2, and 310-3, which are all examples of the chapters 310 (FIG. 3A). The chapters 310-1, 310-2, and 310-3 represent or mark locations within the program 174-1, but the chapters may actually be stored separately from the program 174-1, as previously described above with reference to FIG. 3A.

Figure 3C:
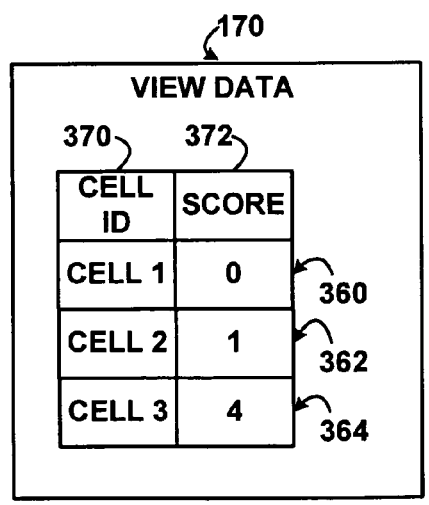
FIG. 3C depicts a block diagram of an example data structure for view data, according to an embodiment of the invention.

FIG. 3C depicts a block diagram of an example data structure for the view data 170, according to an embodiment of the invention. The view data 170 includes records 360, 362, and 364, but in other embodiments any number of records with any appropriate data may be present within the view data 170. Each of the example records includes a cell identifier field 370 and a score field 372. The cell identifier field 370 identifies a cell within the cells 302 of a specified program 174. The score field 372 includes a numeric value representing the importance of the cell 302 identified by the associated cell identifier 370 based on the speed at which the associated cell 370 was presented at the one or more clients 100 and the number of times (the frequency) that the associated cell 370 was presented at the one or more clients 100.

Figure 4:
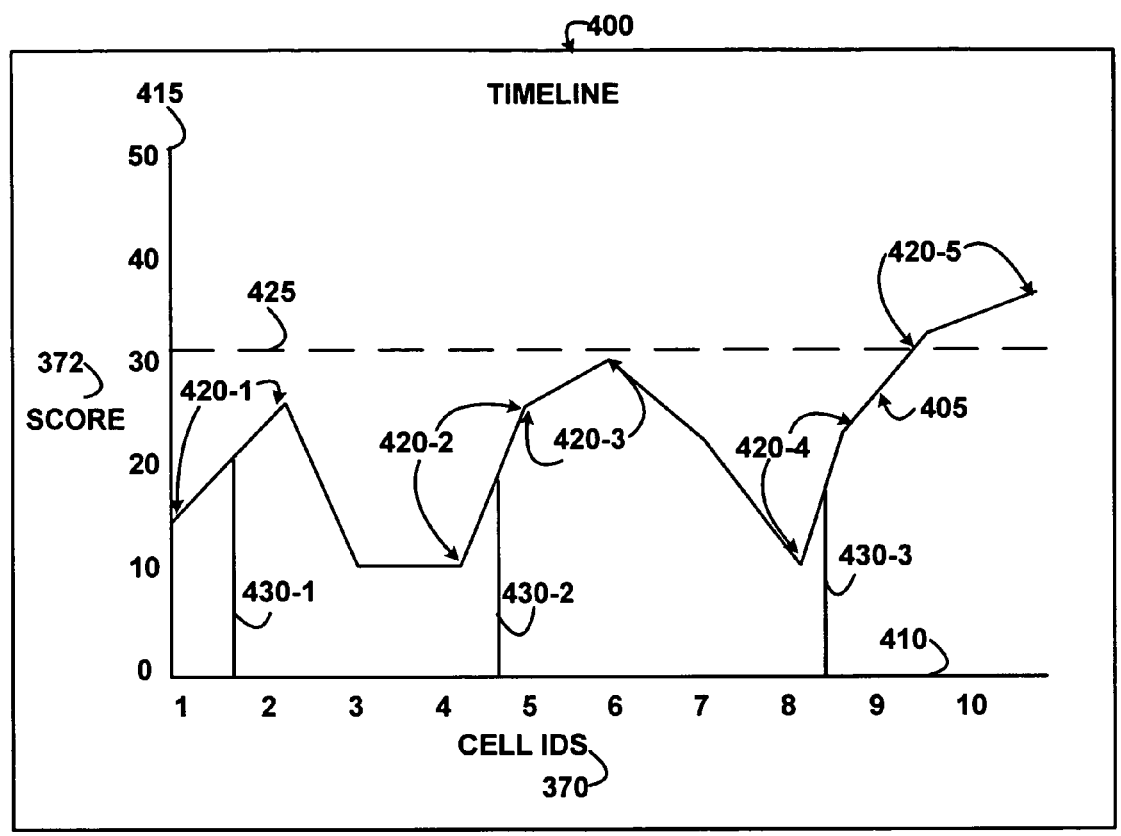
FIG. 4 depicts a block diagram of an example timeline user interface, according to an embodiment of the invention.

FIG. 4 depicts a block diagram of an example timeline user interface 400, which the controller 172 presents via the display 148 (FIG. 1) or the AV output 146 (FIG. 1) according to an embodiment of the invention. The timeline 400 includes a line or curve 405 displayed on an x-axis (horizontal) 410 and a y-axis (vertical) 415, representing a Cartesian coordinate system. The x-axis 410 represents the cell identifiers 370 in the view data 170. The y-axis 300 415 represents the associated scores 372 in the view data 170. Thus, the line 405 represents the scores 372 of the cells 370. The line 405 is composed of segments, such as the example segments 420-1, 420-2, 420-3, 420-4, and 420-5, among others.

The example segments 420-1, 420-2, 420-3, 420-4, and 420-5 have different gradients or slopes. The gradient of a line is the ratio of the change of the line or line segment on the y-axis 415 divided by the change in the line or line segment on the x-axis 410. Thus, the gradient represents the steepness of the line and may be positive, representing a slope upward, or negative, representing a slope downward. The example line segments 420-1, 420-2, and 420-4 have positive gradients that are larger than the gradient of the line segment 420-3, indicating that the line segments 420-1, 420-2, and 420-4 have steeper upwards slopes than the line segment 420-3. The timeline 400 also includes an indicator 425, which the user may manipulate to select different portions of the line 405 based on the scores of the line segments, as opposed to the gradients of the line segments. For example, the line segment 420-5 is above the indicator 425, causing the cells 370 that are associated with the scores 372 on the line segment 420-5 that are above the indicator 425 to be selected for a further operation, such as presentation or saving, as further described below with reference to FIG. 9B.

The timeline 400 also includes identifiers 430-1, 430-2, and 430-3, which are associated with and reflect the position or location of the respective chapters 310-1, 310-2, and 310-3 within the cells 302 identified by the cell identifiers 370, as previously described above with reference to FIG. 3B. The timeline 400 may be dynamically updated in response to presentation of the program 174, in order to facilitate use of the timeline 400 for a subsequent presentation.

FIG. 5 depicts a block diagram of an example chapter user interface 500, according to an embodiment of the invention. The user interface 500 includes a number of chapters 505, which may be specified as a numeric value, and a chapter sensitivity 510, which, in an embodiment, may be selected as low, medium, or high. The controller 172 and/or the aggregator 272 use the number of chapters 505 and/or the chapter sensitivity 510 to adjust the threshold used to determine the chapters 310 (FIG. 3A) based on gradients of the line 405 (FIG. 4), as further described below with reference to FIGS. 9A and 9B. For example, if the number of chapters 505 is high (above a threshold), or if "high" is selected for the chapter sensitivity 510, then the controller 172 and/or the aggregator 272 create more of chapters 310 by selecting a lower threshold for which to compare against the gradients of the line 405.

The user interface 500 further includes a source of chapters 515, which allows the user to select the view data 170 (if any) that is aggregated to create the chapters 310. The source of chapters 515 includes a predefined option 520, a previous viewing by the current viewer option 525, a previous viewing by all viewers option 530, and a previous viewing by a specified viewer(s) option 535.

The predefined option 520 instructs the aggregator 272 and/or the controller 172 to not use the view data 170 in creating the chapters 310. Instead the chapters 310 are predefined by the creator or distributor of the program 174.

The previous viewing(s) by current viewer option 525 instructs the aggregator 272 and/or the controller 172 to use the view data 170 associated with a previous viewing or viewings for one viewer to create the chapters 310 and instructs the aggregator 272 to not aggregate the view data 170 from multiple viewers.

The previous viewing(s) by all viewers option 530 instructs the aggregator 272 and/or the controller 172 to create the chapters 310 based on the aggregated view data 270 from the view data 170 for a viewing or viewings reported by all the available viewers at all available clients 100.

The previous viewing(s) by a specified viewer or viewers option 535 instructs the aggregator 272 and/or the controller 172 to create the chapters 310 based on a viewing or viewings by a specified viewer, list of viewers, or group of viewers. For example, a viewer may wish the chapters 310 to be created based on the viewing habits of a friend or friends who share common viewing interests, or a group of viewers who share common values, backgrounds, hobbies, interests, tastes, or preferences.

Figure 6:
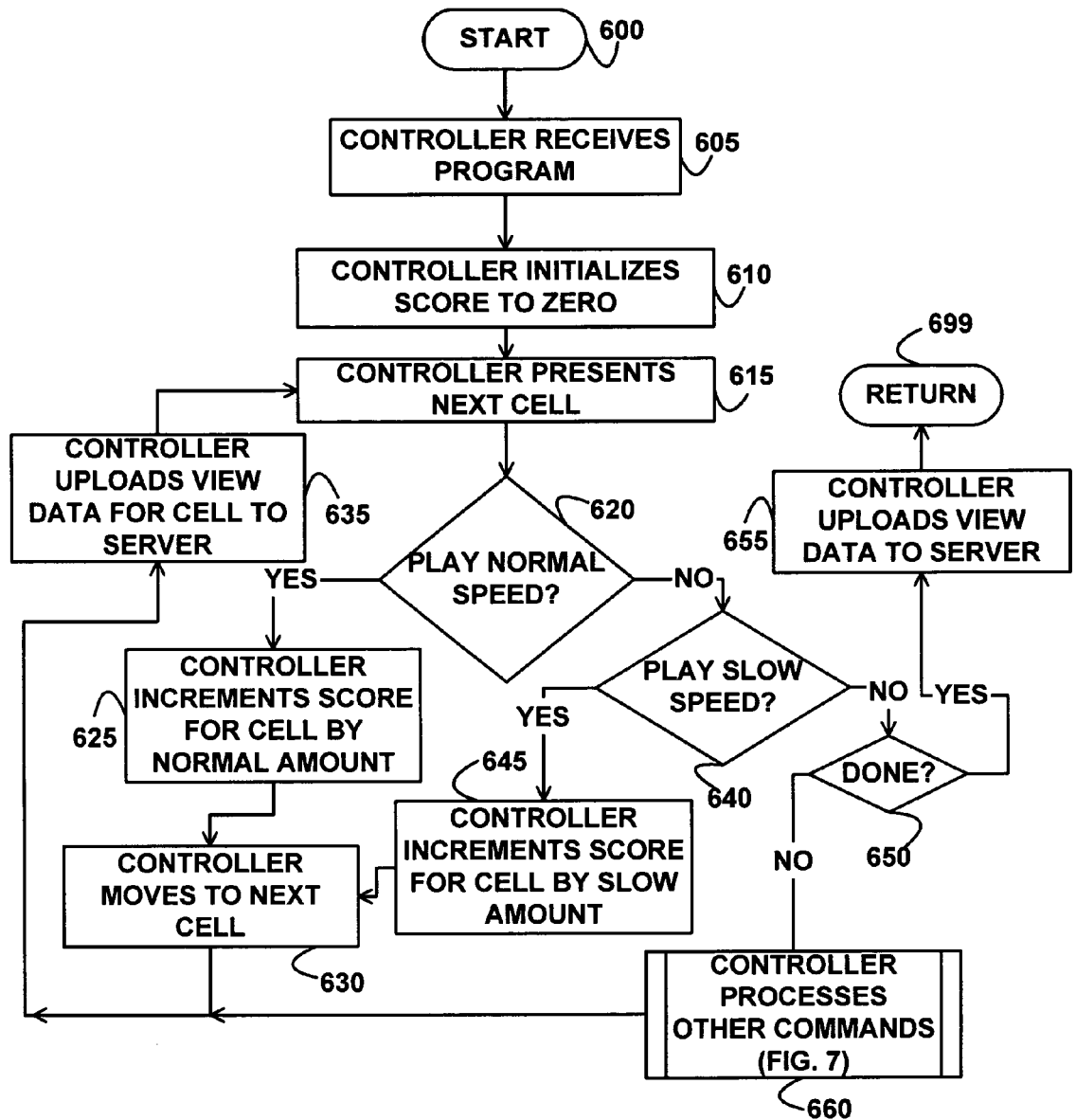
FIG. 6 depicts a flowchart of example processing for presenting a program, according to an embodiment of the invention.

FIG. 6 depicts a flowchart of example processing for playing or presenting the program 174, according to an embodiment of the invention. Control begins at block 600. Control then continues to block 605 where the controller 172 receives the program 174 from the server 200. Control then continues to block 610 where the controller 172 initializes the scores 372 in the view data 170 to zero for all the cells 302 (identified by the cell identifiers 370) in the program 174. Cells that are never presented will thus have a score 372 of zero. Control then continues to block 615 where the controller 172 presents a cell 302, for example via the audiovisual output 146.

Control then continues to block 620 where the controller 172 determines whether the cell previously presented at block 615 was presented at a normal speed. If the determination at block 620 is true, then the presented cell was presented at a normal speed, so control continues from block 620 to block 625 where the controller 172 increments the score 372 associated with the presented cell 302 by a normal amount. In various embodiments a normal amount may be any determined or specified amount that is associated with presenting a cell at a normal speed. Control then continues to block 630 where the controller 172 moves to the next cell within the program 174. Control then continues to block 635 where the controller 172 optionally uploads the record in the view data 170 associated with the previously presented cell to the server 200. Control then returns to block 615 where the controller 172 presents the next cell, as previously described above.

If the determination at block 620 is false, then the cell was not presented at normal speed, so control continues to block 640 where the controller 172 determines whether the cell was presented at a slow speed, for example a slow-motion speed, a super-slow-motion speed, or any other speed slower than the normal speed of block 620. If the determination at block 640 is true, then control continues to block 645 where the controller 172 increments the score 372 associated with the presented cell 302 by a slow amount. In an embodiment, the slow amount is greater than the normal amount of block 625, indicating that the cells that are presented at a slower speed than normal (e.g., in slow-motion) are of more interest. Control then continues from block 645 to block 630, as previously described above.

If the determination at block 640 is false, then the cell was not presented at a slow speed, so control continues from block 640 to block 650 where the controller 172 determines whether presentation of the program 174 is complete. If the determination at block 650 is true, then presentation of the program 174 is complete, so control continues from block 650 to block 655 where the controller 172 optionally uploads the view data 170 for all of the cells 302 in the program 174 to the server 200. Control then continues to block 699 where the logic of FIG. 6 returns.

If the determination of block 650 is false, then presentation of the program 174 is not done, so control continues to block 660 where the controller 172 processes other commands, as further described below with reference to FIG. 7. Control then continues to block 635, as previously described above.

Figure 7:
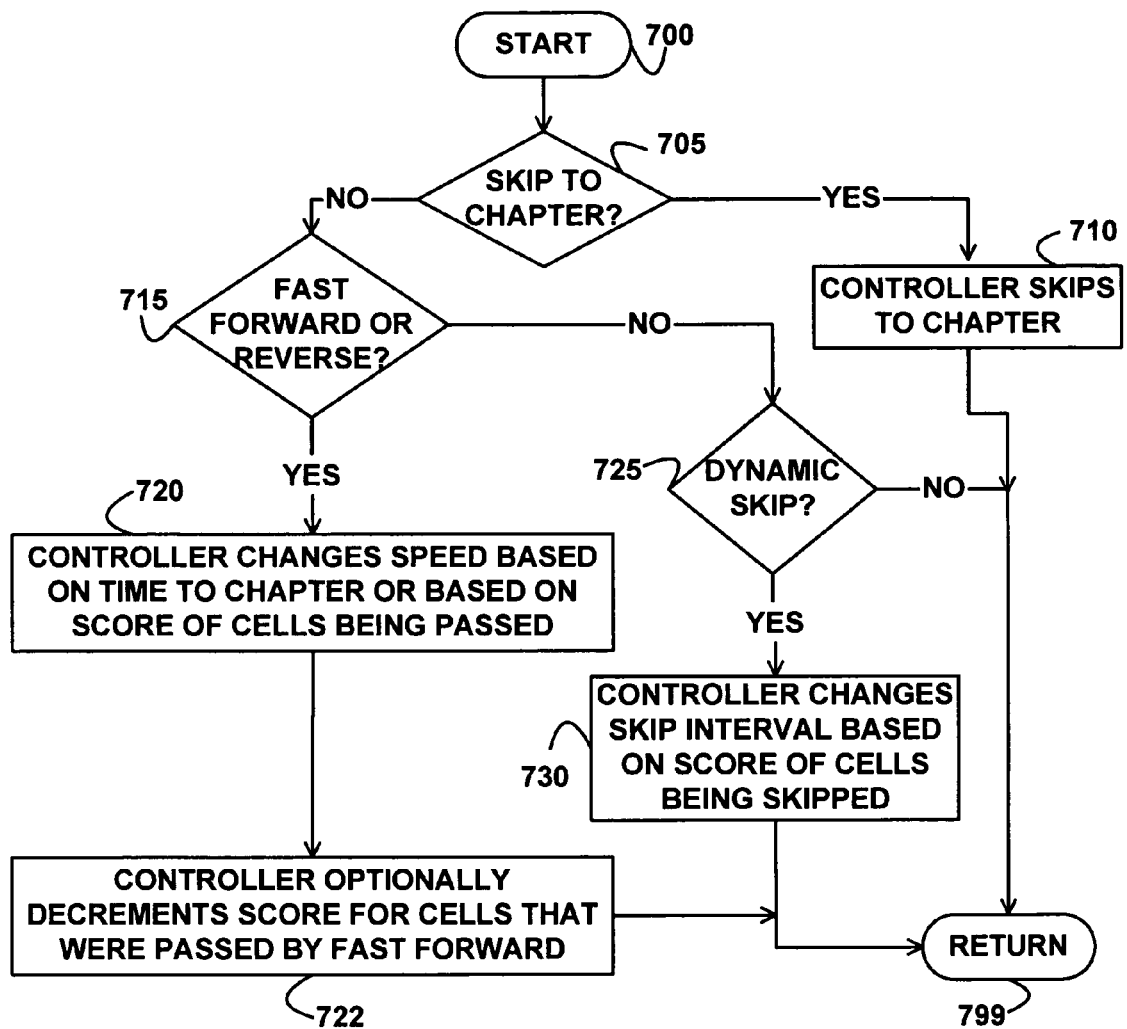
FIG. 7 depicts a flowchart of further example processing for presenting a program, according to an embodiment of the invention.

FIG. 7 depicts a flowchart of further example processing for playing or presenting the program 174, according to an embodiment of the invention. Control begins at block 700. Control then continues to block 705 where the controller 172 determines whether a skip-to-chapter command has been received, e.g., via the key-in 149 (FIG. 1). If the determination at block 705 is true, then a skip-to-chapter command has been received, so control continues to block 710 where the controller 172 skips the presentation of the program 174 from the current cell 302 to a cell associated with the next chapter 310 (or to a specified chapter) in the program 174. For example, if presentation of the program 174-1 is currently at cell 302-2 when a skip-to-chapter command is received, then the controller 172 skips presentation of the program 174-1 from the cell 302-2 to the cell 302-5, which is the first cell following the next chapter 310-2 in the program 174-1. The chapters used by the skip-to-chapter command may be pre-existing chapters, may be chapters created by the controller 172, may be chapters created by the aggregator 272, or any combination thereof. Control then continues to block 799 where the logic of FIG. 7 returns.

If the determination of block 705 is false, then a skip-to-chapter command has not been received, so control continues from block 705 to block 715 where the controller 172 determines whether a fast-forward or reverse command has been received. If the determination of block 715 is true, then control continues to block 720 where the controller 172 changes the speed of the presentation of the program 174 based on the amount of time remaining to the next chapter 310 or based on the score of the cells that are to be passed by the fast-forward or reverse command. For example, if the time to the next chapter 310 is below a threshold, then the controller 172 presents the cells 302 slower then if the time to the next chapter 310 is above a threshold. In another example, if the scores of the cells that are to be passed by the fast-forward or reverse command are below a threshold, then the controller 172 presents the cells faster than if the scores of the cells to be passed by the fast-forward or reverse command are above the threshold. The controller 172 then performs the fast-forward or reverse operation using the determined presentation speed. Control then continues to block 722 where, in an embodiment, the controller 172 decrements the score 372 by a fast-forward amount for the cells 370 that were passed by operation of the fast forward command. Control then continues to block 799 where the logic of FIG. 7 returns.

If the determination of block 715 is false, then a fast-forward or reverse command has not been received, so control continues to block 725 where the controller 172 determines whether a dynamic skip command has been received.

If the determination at block 725 is true, then control continues to block 730 where the controller 172 changes the skip interval used by a dynamic skip operation based on the score 372 of the cells that are to be skipped. For example, if the skipped cells 370 have scores 372 that are below a threshold, then the controller 172 performs the dynamic skip operation by skipping the presentation of a large number of cells or a large amount of time, but if the skipped cells 370 have scores 372 that are above a threshold, then the controller 172 performs the dynamic skip operation by skipping the presentation of a small number of cells or a small amount of time. Control then continues to block 799 where the logic of FIG. 7 returns.

If the determination at block 725 is false, then a dynamic skip command has not been received, so control continues to block 799 where the logic of FIG. 7 returns.

Because of the looping nature of FIGS. 6 and 7, the score 372 for a particular cell 370 may be incremented repeatedly at blocks 625 and 645, every time that the particular cell is presented. This repeated incrementing causes the score field 372 to not only be based on the speed at which the associated cell 370 was presented, but also to be based on the number of times (the frequency) that the associated cell 370 was presented.

Figure 8:
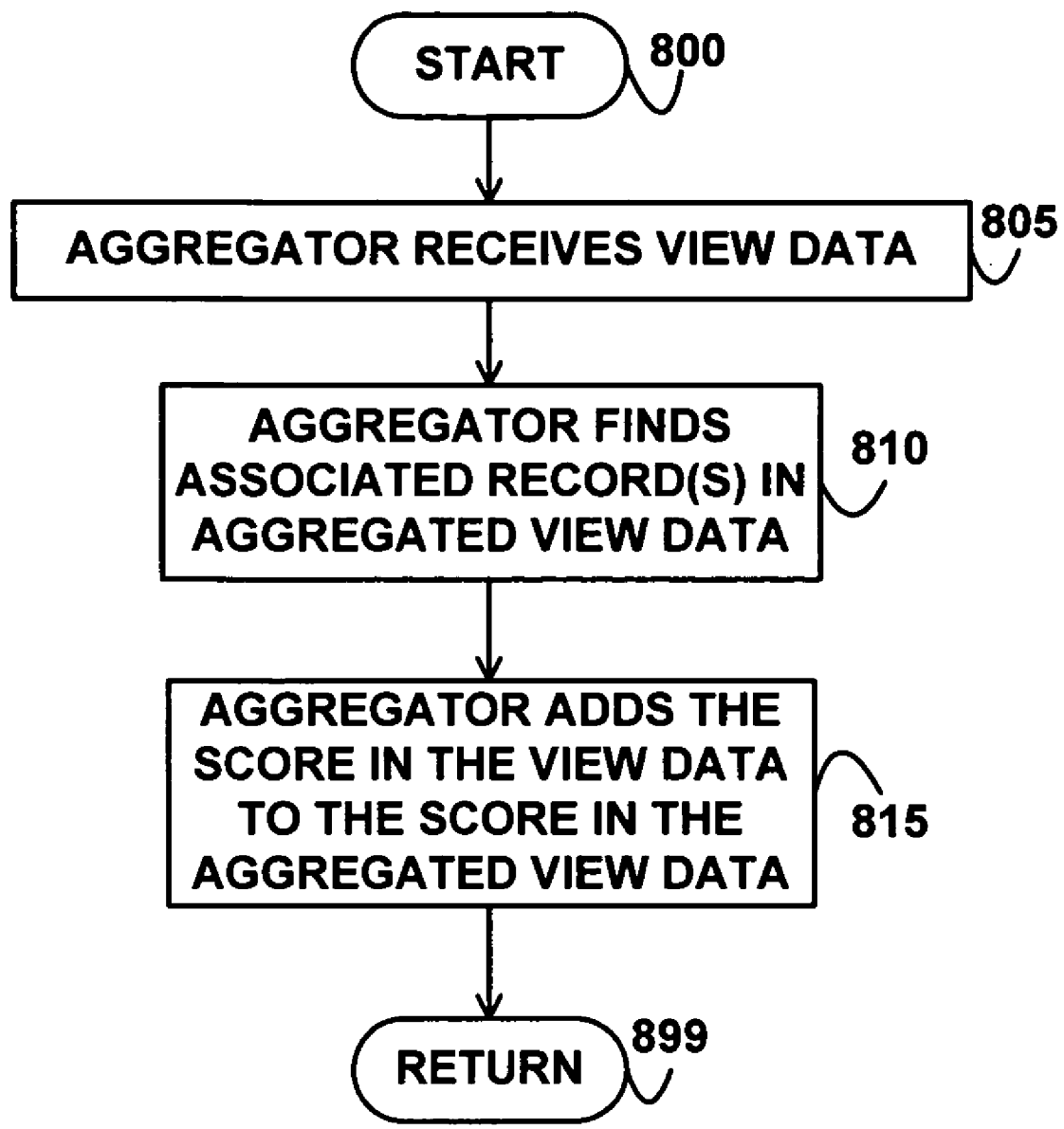
FIG. 8 depicts a flowchart of example processing for aggregating view data, according to an embodiment of the invention.

FIG. 8 depicts a flowchart of example processing for aggregating the view data 170, according to an embodiment of the invention. Control begins at block 800. Control then continues to block 805 where the aggregator 272 receives the view data 170 or optionally a record or records in the view data 170 from the controller 172. Control then continues to block 810 where the aggregator 272 finds the record or records in the aggregated view data 270 associated with a particular program that are associated with the record or records received in the view data 170. In various embodiments, the aggregator 272 may keep a variety of versions of the aggregated view data 270 corresponding to the source of chapters 515 options (FIG. 5). For example, the aggregator 272 may keep one version of the aggregated view data 270 that aggregates all view data 170 for all viewers at all of the clients 100, corresponding to the option 530 (FIG. 5). The aggregator 272 may keep other versions of the aggregated view data 270 for various subsets of all viewers at the clients 100; for example, the aggregator 272 may define various communities of viewers, such as various communities of viewers with shared backgrounds, preferences, tastes, or values, corresponding to the option 535 (FIG. 5). The aggregator 272 may keep still other versions of the aggregated view data 270 for combinations of individual viewers, also corresponding to the option 535 (FIG. 5).

Control then continues to block 815 where the aggregator aggregates or adds the score 372 in the received record or records of the view data 170 to the score in the aggregated view data 270, for every cell in the record or records. Control then continues to block 899 where the logic of FIG. 8 returns.

Figure 9A:
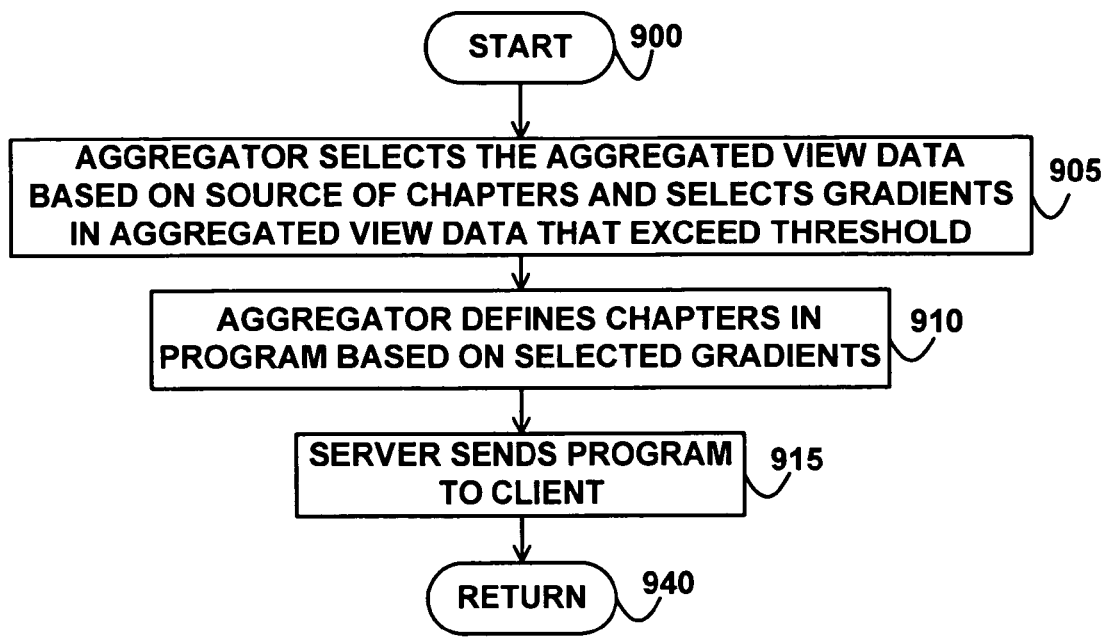
FIG. 9A depicts a flowchart of example processing for defining chapters based on gradients in the aggregated view data, according to an embodiment of the invention.

FIG. 9A depicts a flowchart of example processing for defining chapters 310 based on gradients in the aggregated view data 270, according to an embodiment of the invention. Control begins at block 900. Control then continues to block 905 where the aggregator 272 selects the appropriate aggregated view data 270 to use based on the source of chapters 515, as previously described above with reference to FIGS. 5 and 8. The aggregator 272 further selects a gradient or gradients of line segments representing the scores of the cells in the aggregated view data 270 that exceed a positive threshold. A positive threshold requires that the line segment have an upwards slope, meaning that the scores of the cells are increasing. In the example of FIG. 4, the line segments 420-1, 420-2, and 420-4 have positive gradients that exceed a positive threshold. The aggregator 272 adjusts the positive threshold to achieve the desired number of chapters 505 or adjusts the positive threshold based on the chapter sensitivity 510, as previously described above with reference to FIG. 5.

Control then continues to block 910 where the aggregator 272 defines and positions the chapters 310 in the program 174 based on the selected gradients. In the examples of FIGS. 3 and 4, the aggregator 272 defines and positions the chapters 310-1, 310-2, and 310-3 in the program 174 based on the selected positive gradients 420-1, 420-2, and 420-4, as indicated by the indicators 430-1, 430-2, and 430-3. In an embodiment, the aggregator 272 locates or positions the chapters slightly (within a threshold amount of time) before the middle of the time period associated with the line segment having the gradient that exceeds the positive threshold. Control then continues to block 915 where the server computer 200 sends the program 174 to the client 100, including the chapters 310. Control then continues to block 940 where the logic of FIG. 9A returns.

Figure 9B:
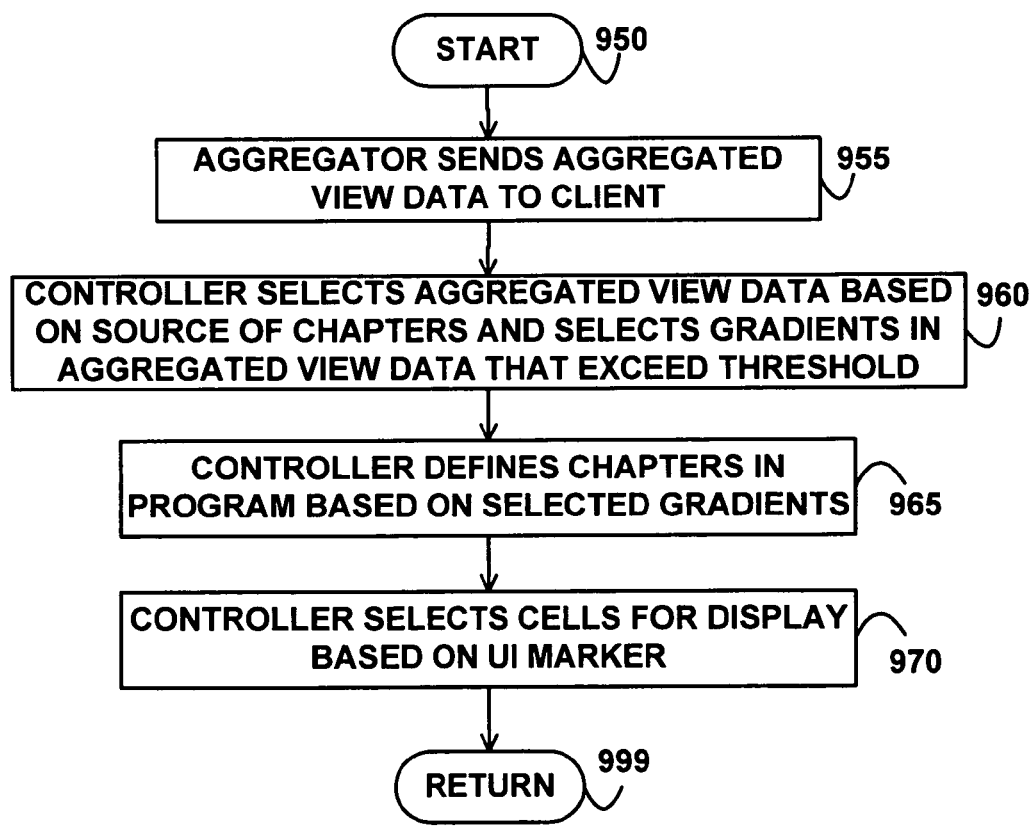
FIG. 9B depicts a flowchart of example processing for defining chapters based on gradients in the aggregated view data, according to another embodiment of the invention.

FIG. 9B depicts a flowchart of example processing for defining and positioning the chapters 310 based on gradients in the aggregated view data 270, according to another embodiment of the invention. Control begins at block 950.

Control then continues to block 955 where, in various embodiments, the aggregator 272 sends the aggregated view data 270 and/or the view data 170 collected from a specified client to the client 100. Control then continues to block 960 where the controller 172 selects the appropriate aggregated view data 270 or view data 170 associated with any appropriate client or clients to use based on the source of chapters 515, as previously described above with reference to FIGS. 5 and 8. The controller 172 further selects a gradient or gradients in the aggregated view data 270 or view data 170 that exceed a positive threshold. The controller 172 adjusts the positive threshold to achieve the desired number of chapters 505 or adjusts the positive threshold based on the chapter sensitivity 510, as previously described above with reference to FIG. 5.

Control then continues to block 965 where the controller 172 defines and positions the chapters 310 in the program 174 based on the selected gradient or gradients. In an embodiment, the controller 172 positions or locates the chapters slightly before (within a threshold amount of time before) the middle of the segment with the gradient that exceeds the positive threshold.

Control then continues to block 970 where the controller 172 selects cells 302 for a further operation, such as presentation or saving of the selected cells based on the position of the user interface indicator 425. For example, the controller 172 selects those cells 370 whose scores 372 (as opposed to the gradients) fall above the indicator 425 on the timeline 400, such as the cells associated with the line segment 420-5 in FIG. 4. Control then continues to block 999 where the logic of FIG. 9B returns.

In the previous detailed description of exemplary embodiments of the invention, reference was made to the accompanying drawing (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized, and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    calculating a score for a cell within a program based on a speed at which the cell was presented; and
    determining a chapter for the program based on the score; and
    skipping presentation of the program on a display to the chapter.

2. The method of claim 1, wherein the calculating further comprises:
    incrementing the score each time the cell is presented.

3. The method of claim 1, wherein the calculating further comprises:
    incrementing the score by a first amount in response to presentation of the cell at a first speed.

4. The method of claim 3, wherein the calculating further comprises:
    incrementing the score by a second amount in response to presentation of the cell at a second speed, wherein the second speed is slower than the first speed and the second amount is greater than the first amount.

5. The method of claim 4, wherein the calculating further comprises:
    decrementing the score by a third amount in response to presentation of the cell at a third speed.

6. The method of claim 1, further comprising:
    changing presentation speed of the program based on an amount of time remaining to the chapter.

7. A computer-readable storage medium encoded with instructions, wherein the instructions when executed comprise:
    calculating a plurality of scores for a plurality of cells within a program based on speeds at which the plurality of cells were presented, wherein each of the cells comprises at least one frame of presentable data;
    determining a chapter for the program based on the plurality of scores; and
    skipping presentation of the program on a display to the chapter.

8. The computer-readable storage medium of claim 7, further comprising:
    aggregating the plurality of scores for a plurality of clients at which the plurality of cells were presented.

9. The computer-readable storage medium of claim 7, wherein the determining further comprises:
    selecting a gradient that exceeds a threshold, wherein the gradient is based on the plurality of scores and the plurality of cells.

10. The computer-readable storage in medium of claim 9, wherein the determining further comprises:
    positioning the chapter based on the gradient that exceeds the threshold.

11. The computer-readable storage medium of claim 7, further comprising:
    changing a presentation speed based on the score of the cells being presented.

12. The computer-readable storage medium of claim 7, further comprising:
    changing a skipped interval based on the score of the cells being skipped during the presentation.

13. The computer-readable storage medium of claim 7, further comprising:
    selecting portions of the program for an operation based on an indicator on a user interface comprising the plurality of scores and indications of the plurality of cells.

14. A method for configuring a computer, comprising:
    configuring the computer to receive a plurality of scores from a plurality of clients;
    configuring the computer to aggregate the plurality of scores, wherein the plurality of scores are associated with a plurality of cells in a program, and wherein the plurality of scores are based on speeds at which the plurality of cells were presented at the plurality of clients;
    configuring the computer to determine a plurality of chapters based on the aggregation of the plurality of scores, wherein the program comprises the plurality of chapters; and
    configuring the computer to skip presentation of the program on a display to one of the plurality of chapters.

15. The method of claim 14, wherein the configuring the computer to determine further comprises:

configuring the computer to determine a plurality of gradients based on the plurality of scores and the plurality of cells.

16. The method of claim 15, wherein the configuring the computer to determine further comprises:
configuring the computer to select a subset of the plurality of gradients that exceeds a threshold.

17. The method of claim 16, wherein the configuring the computer to determine further comprises:
configuring the computer to position the plurality of chapters based on the subset of the plurality of gradients that exceeds a threshold.

18. The method of claim 17, wherein the configuring the computer to determine further comprises:
configuring the computer to position the chapter within a threshold amount of time from a middle of a time period associated wit the gradient that exceeds the positive threshold.

19. The method of claim 14, wherein the plurality of scores are further based on frequencies that the plurality of cells were presented at the plurality of clients.

* * * * *

UNITED STATES PATENT AND TRADEMARK OFFICE
CERTIFICATE OF CORRECTION

PATENT NO. : 7,646,960 B2  Page 1 of 1
APPLICATION NO. : 11/149481
DATED : January 12, 2010
INVENTOR(S) : Garbow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this

Sixteenth Day of November, 2010

David J. Kappos
*Director of the United States Patent and Trademark Office*